Patented Jan. 19, 1954

2,666,797

UNITED STATES PATENT OFFICE 2,666,797

FLUORINATED ALCOHOLS AND ACETATE ESTERS

Donald R. Husted, St. Paul, and Arthur H. Ahlbrecht, White Bear Township, Minn., assignors to Minnesota Mining & Manufacturing Company, St. Paul, Minn., a corporation of Delaware No Drawing. Application May 26, 1950, Serial No. 164,611

6 Claims. (Cl. 260—633)

This invention relates to our discovery of a new and useful group of reactive fluorocarbon compounds having novel properties and useful as chemical intermediates, and to a method of making such compounds.

The novel compounds claimed herein include the 1,1-dihydroperfluoroalkyl alcohols, wherein the molecule contains a non-cyclic saturated fluorocarbon chain (normal or branched) having at least three carbon atoms, which is joined to a reactive hydroxymethyl radical (—CH$_2$OH) having a carbon atom to which two hydrogen atoms are bonded. The general formula of these primary alcohols is:

$$C_nF_{2n+1}CH_2OH$$

where $n$ has a value of 3 to 12 in defining our compounds claimed herein.

The acetate esters of these alcohols are also claimed herein. These esters have the formula:

$$C_nF_{2n+1}CH_2OOCCH_3$$

where $n$ also has a value of 3 to 12.

The first member of the complete series of fluorinated alcohols which are represented by the above general formula when $n$ is not restricted is 1,1-dihydrotrifluoroethyl alcohol (CF$_3$CH$_2$OH), which was prepared some years ago by F. Swarts, Bull. Soc. Chem. Belg., vol. 43, p. 471 (1934). So far as we are aware, neither the second nor the higher members have heretofore been discovered or characterized.

We have found that the alcohols which contain three or more carbon atoms in the fluorocarbon chain (i. e. those containing a total of four or more carbon atoms in the molecule) have distinctive properties not possessed by the first member of the series. The presence of a substantial terminal fluorocarbon chain (fluorocarbon "tail") in the molecule, as contrasted with a single fluorinated carbon atom, is responsible for the development of new characteristics. Furthermore, our compounds also differ from the second member of the series, CF$_3$CF$_2$CH$_2$OH, in significant respects, quite apart from expected differences in boiling point, density, refractive index, etc.

For instance, our alcohols do not easily undergo replacement of the hydroxyl group by bromine, a replacement easily carried out both in the case of trifluoroethyl alcohol (CF$_3$CH$_2$OH) and in the case of the non-fluorinated aliphatic hydrocarbon alcohols. Our butyl, amyl and hexyl alcohols can be reacted with acrylyl chloride in the presence of barium chloride to form acrylate esters containing more than 50% by weight of combined fluorine, which polymerize to form soft, rubbery, nonflammable homopolymers that are both oleophobic and hydrophobic, are resilient to gasoline, oils, and common organic solvents, retain flexibility at low temperatures, and are highly resistant to ozone. These are described and claimed in the companion application of Ahlbrecht, Reid and Husted which has since matured as Patent No. 2,642,416 (June 16, 1953). In contrast, the corresponding acrylate ester of trifluoroethyl alcohol polymerizes to form a hard, flammable homopolymer, which is not oleophobic and which is soluble in common organic solvents (such as methylethyl ketone and methylisobutyl ketone).

The linking of the hydroxyl radical to the fluorocarbon chain by a methylene group enhances stability, reactivity and solubility. On the other hand, the direct bonding of a saturated florocarbon chain to this single methylene group, thereby providing the molecule with a fluorocarbon "tail" which is both hydrophobic and oleophobic at normal temperatures, results in the molecule having unique properties which it would not have if this chain were a hydrocarbon chain or even a partially fluorinated chain. Saturated fluorocarbons are highly inert and stable. Due to the fluorocarbon "tail" our alcohols are only slightly soluble in water (less than 1% by weight at 25° C.), the higher members being highly insoluble in water, and they have marked surface activity. In contrast, the trifluoroethyl alcohol of Swarts, CF$_3$CH$_2$OH, is infinitely miscible with water at room temperature and is not surface active.

The present non-cyclic fluorocarbon alcohols, while they have the functional hydroxymethylene group of aliphatic hydrocarbon primary alcohols (—CH$_2$OH), actually have reaction characteristics which in some respects more nearly resemble those of the aromatic alcohols or phenols.

For example, the first member of our series of alcohol compounds, 1,1-dihydroheptafluorobutyl alcohol (C$_3$F$_7$CH$_2$OH), esterifies with some difficulty, whereas aliphatic hydrocarbon alcohols esterify easily in the presence of strong acid catalysts. It does not easily undergo replacement of the hydroxyl group by bromine, a reaction easily carried out on both the aliphatic hydrocarbon alcohols and on trifluoroethyl alcohol. It differs from the aliphatic hydrocarbon alcohols in the rate at which it reacts with sulfuric acid. A good yield can be recovered after distillation from sulfuric acid, whereas aliphatic hydrocarbon alcohols are recovered in very poor yield, substantial amounts being converted to the corresponding ether, a phenomenon which we have not observed in the case of our fluorocarbon alcohols. In the case of our compounds, the reaction product with sulfuric acid appears to be the sulfate of the alcohol.

Our alcohol compounds have value as chemical intermediates for the making of other compounds and it is a particular advantage that they contain a polycarbon fluorocarbon chain so as to be able to introduce such a chain into derivative compounds of various kinds. The presence of such a polycarbon fluorocarbon chain, containing three or more carbon atoms, is desirable in many compounds because it imparts properties not obtainable with a $-CF_3$ or even with a $-C_2F_5$ radical. For example, the longer fluorocarbon chains have a marked effect on surface active properties and are often needed in order to obtain desired characteristics. Therefore, a feature of our invention is that we have now made it possible to utilize 1,1-dihydroperfluoroalkyl alcohols as chemical intermediates to obtain derivatives which contain a saturated fluorocarbon chain having three or more carbon atoms.

Our alcohol compounds are useful in the preparation of esters, including polymerizable esters from which nonflammable polymers can be made, and of derivatives having low surface tension properties, and of dyes, insecticides, and medicinals. The acetate esters have utility as solvents and plasticizers for highly fluorinated polymers, and as chemical intermediates.

While, as previously indicated, the alcohols of our invention and the prior alcohol of Swarts, $CF_3CH_2OH$, can be represented by a common generic formula, and in this sense they are members of a common "series," this circumstance does not of itself imply that they behave similarly. In fact they behave so differently as to make plain that they belong to specifically different series of compounds. The compound $CF_3CH_2OH$ can more accurately be regarded as the first member of the normal homologous series represented by the formula: $CF_3(CH_2)_mOH$; a series characterized by the point that the molecules have a terminal trifluoromethyl group $(CF_3-)$ which is linked to a terminal hydroxyl group $(-OH)$ by one or more interposed methylene groups $(-CH_2-)$, the latter being the incremental unit of the series. The distinction over our alcohols is made plain by the fact that the latter cannot be represented by this formula, regardless of the value of $m$, but instead can be represented (as to normal compounds) by the series formula: $CF_3(CF_2)_nCH_2OH$, where $n$ has an integer value of at least two, the incremental unit being the $-CF_2-$ group.

The following table lists the approximate boiling points (at 740 mm.) of the normal chain alcohol compounds of this invention in the range of 3 to 12 carbon atoms in the fluorocarbon chain.

| Compound: | B. P. (° C.) |
|---|---|
| $C_3F_7CH_2OH$ | 95 |
| $C_4F_9CH_2OH$ | 111 |
| $C_5F_{11}CH_2OH$ | 128 |
| $C_6F_{13}CH_2OH$ | 144 |
| $C_7F_{15}CH_2OH$ | 160 |
| $C_8F_{17}CH_2OH$ | 176 |
| $C_9F_{19}CH_2OH$ | 192 |
| $C_{10}F_{21}CH_2OH$ | 208 |
| $C_{11}F_{23}CH_2OH$ | 224 |
| $C_{12}F_{25}CH_2OH$ | 240 |

The first member of this series, 1,1-dihydro-n-heptafluorobutyl alcohol ($n-C_3F_7CH_2OH$), is a colorless liquid having a boiling point of 95° C. (at 749 mm.), a refractive index (at 20° C.) of 1.294, a density (grams/cc. at 20° C.) of 1.600, and a surface tension of 22.5 dynes/cm. at 20° C. The acetate ester is a colorless liquid having a boiling point of about 105° C. (at 735 mm.), a refractive index of 1.3110, a density of 1.435 and a surface tension of 15.6 dynes/cm. The acrylate ester is a colorless liquid having a vacuum boiling point of 43° C. (at 40 mm.), a refractive index of 1.3327, and a density of 1.455.

1,1 - dihydro - n - undecafluorohexyl alcohol ($n-C_5F_{11}CH_2OH$) is a colorless liquid having a boiling point of 129° C. (at 752 mm.), a refractive index of 1.304, and a density of 1.686.

The melting point increases with increasing chain length and higher members of the alcohol series are colorless solids at room temperature. For example, 1,1-dihydro-n-nonadecafluorodecyl alcohol ($n-C_9F_{19}CH_2OH$), having a boiling point of 192° C. (at 735 mm.), has a melting point of about 87° C. The acetate ester of this alcohol has a boiling point (micro) of 208° C. (at 751 mm.) and is a colorless viscous liquid.

METHODS OF MAKING

We have found several methods for making the fluorocarbon alcohols of this invention.

They can be prepared by the reduction of the fluorocarbon monocarboxylic acids which have a corresponding fluorocarbon radical, using lithium aluminum hydride ($LiAlH_4$) as the reduction agent in an anhydrous ether vehicle. By this procedure the alcohols, $C_nF_{2n+1}CH_2OH$, are formed by reduction of the corresponding acids, $C_nF_{2n+1}COOH$.

Instead of using the fluorocarbon acids, use can be made of the corresponding acid chlorides, $C_nF_{2n+1}COCl$, as starting compounds for reduction to the desired alcohols.

We have also found that our alcohols can be prepared in pure form by catalytic hydrogenation of the alkyl esters (e. g., the methyl and ethyl esters) of the fluorocarbon monocarboxylic acids, using a copper chromium oxide catalyst. In general, the pressure should be at least about 1,500 lbs./sq. in. and the temperature at least about 200° C. Thus by this procedure the desired alcohols can be formed by reduction of the corresponding methyl esters, $C_nF_{2n+1}COOCH_3$.

The following examples illustrate the use of each of these three procedures, and also illustrate the preparation of the acetate esters.

Example 1

This example illustrates the preparation of $n-C_3F_7CH_2OH$ by the lithium aluminum hydride reduction of normal heptafluorobutyric acid ($n-C_3F_7COOH$).

The reaction vessel was a dry 3000 ml. 3-necked glass flask equipped with a stirrer, a water-cooled reflux condenser, a dropping funnel, and a gas inlet tube so that dry nitrogen could be flowed through the system. The apparatus was dried at 120° C. before use, and assembled while still hot with dry oxygen-free nitrogen passing through the apparatus.

(*Warning.*—Precautions must be observed in using the lithium aluminum hydride reduction agent. It is sensitive to $H_2O$ and $CO_2$ in air, is spontaneously inflammable with water, and inflames on rubbing unprotected in a mortar. It should be ground in a mortar under a nitrogen atmosphere, and should be added rapidly to the flask with a slow nitrogen stream flowing through the system. In case of a fire, do not use a water or carbon dioxide fire extinguisher. Use nitrogen gas or a dry sodium chloride powder as an extinguisher.)

With nitrogen flowing through the system (a flow of 0.1 to 0.2 cubic feet per hour is sufficient during the reaction), the flask was charged with 1250 ml. of dry diethyl ether and 19 grams (0.5 mol.) of powdered lithium aluminum hydride ($LiAlH_4$). The suspension was stirred until the $LiAlH_4$ had dissolved, leaving only a slight haze of insoluble impurities in suspension. Two hours of stirring is usually sufficient.

To the solution was added dropwise 107 grams (0.5 mol.) of $n$—$C_3F_7COOH$ in 1000 ml. of dry diethyl ether while the flask was kept cool in an ice bath. The addition was made at a rate that produced a gentle reflux of the ether. Then the nitrogen was turned off and the reaction mixture was stirred for 48 hours. The nitrogen was then turned on with the flow rate increased to 2 cu. ft./hr., and the flask was cooled with an ice-salt mixture. Water was added dropwise until hydrogen was no longer evolved, so as to decompose the excess $LiAlH_4$, and a few ml. additional water was added as a safety measure. (Nitrogen must be flowing through the apparatus during the addition of water as otherwise there is considerable danger of fire. The water inlet tube should extend almost to the level of the ether so that no water strikes the side of the flask where a film of unreacted $LiAlH_4$ may have collected.)

With continued cooling of the flask, addition was made of an ice-cold solution of 80 ml. (1.5 mol.) of concentrated sulfuric acid in 200 ml. of water. Two layers were formed, the top layer being an ether layer and the bottom layer being aqueous. The bottom layer was separated and extracted three times with ether. The ether extracts were combined with the top layer and the ether was removed in a stripping still having 4–6 theoretical plates. The residue was dried over anhydrous calcium sulfate ("Drierite") and distilled through an efficient semi-micro fractionating column having 8–10 theoretical plates. The cut boiling from 85–95° C., which weighed about 90 grams, was found to contain the desired product.

This cut was charged into a 2-necked, 200 ml. flask equipped with a dropping funnel and a dry semi-micro fractionating column. 35 ml. of concentrated sulfuric acid was slowly added through the dropping funnel and the resulting mixture was refluxed gently to cause decomposition of the aldehydrol by-product. The released aldehyde was distilled out at a temperature of 28–30° C. Then the desired alcohol product was distilled out of the sulfuric acid mixture at 90–95° C. The crude product was redistilled through an efficient semi-micro column (8–10 theoretical plates), yielding the desired $n$—$C_3F_7CH_2OH$ in purified form. This compound had the properties previously mentioned. It was further identified by analyses of the F and OH content, the values being in substantial agreement with those calculated from the formula. The yield of the alcohol was about 40%.

The aldehyde product, $C_3F_7CHO$, was also obtained in a 40% yield. These fluorocarbon aldehydes and their hydrates (aldehydrols) are more fully described, and are claimed, in our copending application S. N. 120,008, filed on October 6, 1949, since issued as Patent No. 2,568,500 on September 18, 1951.

Example 2

This example illustrates the preparation of $n$—$C_3F_7CH_2OH$ by the lithium aluminum hydride reduction of normal heptafluorobutyryl chloride ($C_3F_7COCl$).

The reaction apparatus was similar to that described in the preceding example except that a 500 ml. flask was used and it was equipped with a condenser cooled by solid-$CO_2$ instead of a water-cooled condenser. The same precautions were employed in the handling of the lithium aluminum hydride and in maintaining an adequate flow of dry oxygen-free nitrogen through the system, the details of which will not be repeated.

The flask was charged with 250 ml. of dry diethyl ether and 3.68 grams (0.097 mol.) of powdered $LiAlH_4$, and the mixture was stirred until the latter had dissolved. To the solution was added dropwise 42 grams (0.181 mol.) of heptafluorobutyryl chloride ($C_3F_7COCl$) while the flask was cooled in an ice bath to keep the ether at gentle reflux. The stirring was continued for an additional 2 hours with cooling and then for a further 2½ hours with sufficient heating to maintain a gentle reflux. The flask was then cooled in an ice-salt mixture and sufficient water was added dropwise to decompose excess $LiAlH_4$, and a few ml. additional water was added for safety.

Following this, an ice-cold solution of 25 ml. (0.442 mol) of concentrated sulfuric acid in 200 ml. of water was added with continued cooling. The two layers were separated and the water layer was extracted three times with ether. The ether layer and the ether extracts were combined and placed in a "deep freeze" refrigeration cabinet (temperature of about —20° C.) until the larger portion of the water had frozen out. The supernatant liquid was then decanted and the ether removed in a stripping still having 4–6 theoretical plates. The oily residue was dried with a small amount of anhydrous calcium sulfate and distilled through an efficient semi-micro fractionating column having 8–10 theoretical plates. It was found that the final traces of water can be removed by redistillation from a small amount of concentrated sulfuric acid, but this expedient is not always necessary. The cut boiling at about 95° C. was the desired product, and had the properties previously mentioned.

Example 3

This example illustrates the preparation of $n$—$C_3F_7CH_2OH$ by the high-pressure hydrogenation of normal methyl heptafluorobutyrate ($C_3F_7COOCH_3$) in the presence of a catalyst.

The reaction was conducted in a steel pressure vessel of the type employed for high-pressure hydrogenation work, having a capacity of 180 ml. It was charged with 77 grams (0.338 mol) of $n$—$C_3F_7COOCH_3$ and 3.85 grams of copper chromium oxide catalyst. This catalyst was prepared according to the procedure of Lazier, as described at page 13 of Adkin's book, "The Reactions of Hydrogen With Organic Compounds Over Copper Chromium Oxides and Nickel Catalysts" (University of Wisconsin Press). Analysis of the catalyst employed showed that it contained traces of barium (probably as the oxide), and further experiments indicated that the presence of barium was beneficial in causing higher yields of the alcohol product than could be obtained using copper chromium oxide catalysts containing no barium.

The reaction vessel was closed, made gas tight, and secured in an agitating device which provided a heating bath equipped with thermostatically controlled electrical heating elements. Connection was made to a hydrogen supp'y and hydrogen was introduced until a pressure of 2500 lbs./sq. in. was reached. Agitation was started and the reaction vessel was heated as rapidly as possible to 215° C. The temperature was maintained at 210–230° C. with continued agitation until hydrogen absorption was completed. The progress of the reaction was followed by the change in pressure gauge readings. The heating increased the initial pressure, and the pressure thereafter decreased as the reaction progressed until completion was indicated by the constancy of the pressure. (Note: The pressure should never be less than about 1500 lbs./sq. in. if the reaction is to run smoothly to completion.)

The agitation was now stopped, the vessel cooled, and the pressure released. With the aid of two 10 ml. portions of 95% methyl alcohol, the contents was transferred to a 200 ml. bottle. The cata'yst was removed by centrifuging and was washed with a 5 ml. portion of methyl alcohol.

The product and the wash liquors were combined and distilled through an efficient micro distillation column having 15 theoretical plates. The cut boiling at about 95° C. was the desired product, and had the properties previously mentioned.

Example 4

This example illustrates the preparation of $n$—$C_9F_{19}CH_2OH$, 1,1-dihydro-n-nonadecafluorodecyl alcohol, by the high-pressure hydrogenation of normal methyl nonadecafluorocaprate $$(C_9F_{19}COOCH_3)$$

in the presence of a catalyst.

The reaction vessel employed in the preceding example was charged with 15.7 grams of normal methyl nonadecafluorocaprate and 1.5 grams of the copper chromium oxide catalyst. After closing, hydrogen was introduced to a pressure of 2390 lbs./sq. in. at about 29° C., and then the vessel was heated to 210° C. (producing a pressure of about 3480 lbs./sq. in.) and was held at this temperature for eight hours.

The reduction product, which was a white solid, was removed by dissolving in ether and was separated from the catalyst by filtering. The product was recovered by evaporating off substantially all of the ether and crystallizing the product, which was found to have a melting point of 87–87.5° C. and a boiling point (micro) of 192° C. at 735 mm.

Example 5

This example illustrates the preparation of the alcohols by the reduction of the methyl esters with lithium aluminum hydride, as exemplified by the reduction of  to produce $n$—$C_9F_{19}CH_2OH$.

The procedure was essentially the same as that previously described in Example 1. The flask was charged with 100 ml. of dry diethyl ether, 1.3 grams of lithium aluminum hydride added with stirring until it was in solution, and then 18 grams of normal methyl nonadecafluorocaprate was added as a 100 ml. ether solution at such a rate as to maintain a gentle reflux. Stirring was continued at room temperature for an hour, water and sulfuric acid were added as previously explained, the ether layer was separated and the aqueous layer was extracted with fresh ether. The ether layer and washes were combined and the ether was removed by distillation. The alcohol product was recovered by fractional distillation. The distillate partly crystallized. The crystals were filtered from the pasty mass and purified by sublimation in a high vacuum ($10^{-4}$ to $10^{-5}$ mm.). The purified product was identified as being 1,1-dihydro-n-nonadecafluorodecyl alcohol.

The next two examples illustrate the preparation of acetate esters of the 1,1-dihydroperfluoroalkyl alcohols.

Example 6

This example relates to the preparation of the acetate ester of 1,1-dihydro-n-heptafluorobutyl alcohol.

A clean dry flask fitted with a reflux condenser was charged with 25 grams (0.125 mols) of the alcohol ($n$—$C_3F_7CH_2OH$), 25 grams (0.25 mols) of acetic anhydride, and 10 grams (0.125 mols) of pyridine. The mixture was refluxed over night, water was added and two layers separated. The oily layer (commonly the bottom layer) was washed twice with water, twice with a 5% sodium bicarbonate solution, and then twice with water. The oil was then dried with anhydrous calcium chloride and purified by distillation.

This product was an oily liquid, identified as being relatively pure 1,1-dihydro-n-heptafluorobutyl acetate ($n$—$C_3F_7CH_2OOCCH_3$), and was found to have the following properties:

| | |
|---|---|
| Boiling point (at 735 mm.) | 105° C. |
| Refractive index (at 20° C.) | 1.3110 |
| Molar refraction (found) | 32.6 |
| Molar refraction (calc.) | 32.6 |
| Density (grams/cc. at 20° C.) | 1.435 |
| Surface tension (dynes/cm. at 20° C.) | 15.6 |
| Pour point | −80° C. |
| Percent fluorine (by analysis) | 54 |
| Percent fluorine (calc.) | 55 |

Example 7

This example relates to the preparation of the acetate ester of 1,1-dihydro-n-nonadecafluorodecyl alcohol; the procedure being similar to that of the preceding example.

The flask was charged with 5.5 grams (0.011 mols) of the alcohol ($n$—$C_9F_{19}CH_2OH$), 2.24 grams (0.022 mols) of acetic anhydride, and 5 drops of pyridine. The mixture was refluxed for two hours and was left standing over night at room temperature. Then the mixture was poured into ice water; and the oily layer was removed and washed with 5% sodium bicarbonate solution and with water. The remaining oil material was purified by molecular distillation in a high vacuum Hickman type still at a plate temperature of 50–75° C. and a pressure of $10^{-5}$ mm. The product, a colorless viscous liquid at room temperature, was identified as relatively pure 1,1-dihydro-n-nonadecafluorodecyl acetate

It had a boiling point (micro) of 208° C. at 751 mm., a refractive index (at 20° C.) of 1.3189, and a density (at 20° C.) of 1.709.

Example 8

This example relates to the preparation of the perfluorobutyrate ester of 1,1-dihydro-n-heptafluorobutyl alcohol.

A clean dry flask fitted with a reflux condenser was charged with 10 grams (0.05 mols) of the alcohol ($n$—$C_3F_7CH_2OH$), and 15 grams (0.065 mols) of heptafluorobutyryl chloride (C₃F₇COCl). The mixture was refluxed for 2½ hours. The ester product was isolated by direct fractional distillation, and was identified as 1,1-dihydro-n-heptafluorobutyl heptafluorobutyrate $(n\text{---}C_3F_7CH_2OOCC_3F_7)$ in a somewhat impure state. The sample had a boiling point of 118–120° C. (at 733 mm.), a refractive index (at 20° C.) of 1.290, and a density (at 20° C.) of 1.612.

PREPARATION OF FLUOROCARBON ACIDS AND DERIVATIVES USED AS STARTING COMPOUNDS

The previously described methods of making the 1,1-dihydroperfluoroalkyl alcohols have utilized as starting compounds the corresponding fluorocarbon monocarboxylic acids and their acid chlorides and methyl esters.

These acids can be prepared by the Simons' electrochemical process. According to this process, a solution of anhydrous liquid hydrogen fluoride containing a dissolved hydrocarbon carboxylic acid, having the same carbon skeletal structure as the desired fluorocarbon acid, (or the anhydride of such acid), is electrolyzed by passing a direct current through the solution at a cell voltage which is insufficient to generate molecular (free elemental) fluorine under the existing conditions, but which is sufficient to cause the formation of the fully fluorinated acid fluoride derivative at a useful rate. The fluorocarbon acid fluoride, which results from complete replacement of the carbon-bonded hydrogen atoms, and of the hydroxyl group, by fluorine atoms, is relatively insoluble in the electrolyte solution and either settles to the bottom of the cell from which it can be drained along with other fluorocarbon products of the process, or is volatilized and evolves from the cell in admixture with the hydrogen and other gaseous products.

The gaseous mixture from the cell, when it contains a fluorocarbon acid fluoride in vapor phase, can be preliminarily cooled to condense out the bulk of the volatilized hydrogen fluoride present (which is returned to the cell), and the gaseous mixture (which may contain traces of hydrogen fluoride) can then be warmed to room temperature and passed through water, in which the fluorocarbon acid fluoride dissolves and is hydrolyzed to the acid. The liquid product of the cell drained from the bottom, can be washed with water to recover the fluorocarbon acid fluoride component when present, which hydrolyzes to the acid. The fluorocarbon acid can be recovered by distillation. The fluorocarbon acid chlorides can be derived from the corresponding acids by direct treatment with phosphorous pentachloride. The methyl esters can be made by reacting either the acid or the acid chloride with methyl alcohol.

The electrochemical process can be practiced with simple single compartment electrolytic cell arrangements. No diaphragm is needed between electrodes. The cell can be operated at 0° C. and atmospheric pressure. The cell and the cathodes can be made of steel, and the anodes of nickel, the electrode pack consisting of closely spaced alternating sheets of nickel and steel. Operating voltages are in the range of about 5 to 8 volts, D. C. Current densities of the order of 20 amperes per sq. ft. of anode surface can easily be obtained.

The electrochemical fluorination process is broadly described and claimed in the copending application of J. H. Simons, Ser. No. 62,496, filed on November 29, 1948, since issued as Patent No. 2,519,983 on August 22, 1950. The saturated fluorocarbon monocarboxylic acids containing at least three carbon atoms in the fluorocarbon radical, and their acid chlorides and esters, are described and claimed in the copending application of A. R. Diesslin, E. A. Kauck, and J. H. Simons, Ser. No. 70,154, filed on January 10, 1949, since issued as Patent No. 2,567,011 on September 4, 1951, which also contains a description of the electrochemical process. Heptafluorobutyric acid and various of its derivatives have been described in a brochure published by Minnesota Mining & Manufacturing Company (St. Paul, Minnesota) in October, 1949, as advertised in Chemical and Engineering News, issue of October 17, 1949, at page 3061.

We claim:

1. As new compounds, the 1,1-dihydroperfluoroalkyl alcohols, having the formula:

$$C_nF_{2n+1}CH_2OH$$

where $n$ has a value of 3 to 12, and the acetate esters thereof.

2. The compound 1,1-dihydroheptafluorobutyl alcohol, having the formula $C_3F_7CH_2OH$.

3. The compound 1,1-dihydrononafluoroamyl alcohol, having the formula $C_4F_9CH_2OH$.

4. The compound 1,1-dihydroundecafluorohexyl alcohol, having the formula $C_5F_{11}CH_2OH$.

5. The compound 1,1-dihydropentadecafluorooctyl alcohol, having the formula $C_7F_{15}CH_2OH$.

6. The compound 1,1-dihydrononadecafluorodecyl alcohol, having the formula $C_9F_{19}CH_2OH$.

DONALD R. HUSTED.
ARTHUR H. AHLBRECHT.

References Cited in the file of this patent

UNITED STATES PATENTS

| Number | Name | Date |
|---|---|---|
| 2,079,414 | Lazier | May 4, 1937 |
| 2,137,407 | Lazier | Nov. 22, 1938 |
| 2,559,628 | Joyce | July 10, 1951 |
| 2,568,500 | Husted et al. | Sept. 18, 1951 |
| 2,568,501 | Husted et al. | Sept. 18, 1951 |

OTHER REFERENCES

Swarts: "Chem. Abstracts," vol. 28, page 1987 (1934).

Gilman et al.: Journal American Chemical Society, vol. 70, pages 1281–1282 (1948).

Henne et al.: J. Amer. Chem. Soc., vol. 70, page 1968 (1948).

Henne et al.: J. Amer. Chem. Soc., vol. 75, pages 991–992 (Feb. 20, 1953).